US006077010A

United States Patent [19]
Reid et al.

[11] Patent Number: 6,077,010
[45] Date of Patent: Jun. 20, 2000

[54] WALL BOLT ASSEMBLY

[75] Inventors: Leonard F. Reid, Issaquah; Charles M. Copple, Kent; Timonth H. Johnson, Seattle, all of Wash.

[73] Assignee: Fatigue Technology, Inc., Seattle, Wash.

[21] Appl. No.: 09/334,287

[22] Filed: Jun. 16, 1999

[51] Int. Cl.⁷ .............................. F16B 21/18; F16B 39/00
[52] U.S. Cl. ........................... 411/107; 411/113; 411/353
[58] Field of Search .................................. 411/105, 111, 411/112, 113, 352, 353, 107, 183

[56] References Cited

U.S. PATENT DOCUMENTS

| | | | |
|---|---|---|---|
| 3,868,806 | 3/1975 | Dey | 411/353 |
| 4,594,040 | 6/1986 | Molina | 411/353 |
| 4,616,967 | 10/1986 | Molina | 411/105 |
| 5,076,747 | 12/1991 | Cosenza | 411/353 |
| 5,399,053 | 3/1995 | Duran | 411/105 X |
| 5,468,104 | 11/1995 | Reid et al. | 411/113 |

Primary Examiner—Neill Wilson
Attorney, Agent, or Firm—Delbert J. Barnard

[57] ABSTRACT

A tubular stem (16) of a bolt mount (12) is coldexpanded into an opening (70) in a wall (72). A second wall (76) is placed against the first wall (72), with an opening (70) in it in alignment with the center opening (32) in the tubular stem (16). An elongated shank portion (88) of a tubular nut (86) is inserted through the opening (70) and then through a center opening (32) in the tubular stem (16), and into an annular space (58) defined by and between a tubular sidewall (48) of a bolt-element retainer (14) and a bolt-element (54). The tubular bolt (86) has internal threads (90) that mesh with and thread onto external threads (56) on the bolt-element (54). The tubular nut (86) is rotated until a head (84) on its end is in tight clamping engagement with the portion of the second wall (76) that surrounds the opening in the second wall. Tightening of the tubular nut (86) draws the bolt-element retainer (14) and the tubular nut (86) together, firmly connecting the second wall (76) to the first wall (72).

18 Claims, 3 Drawing Sheets

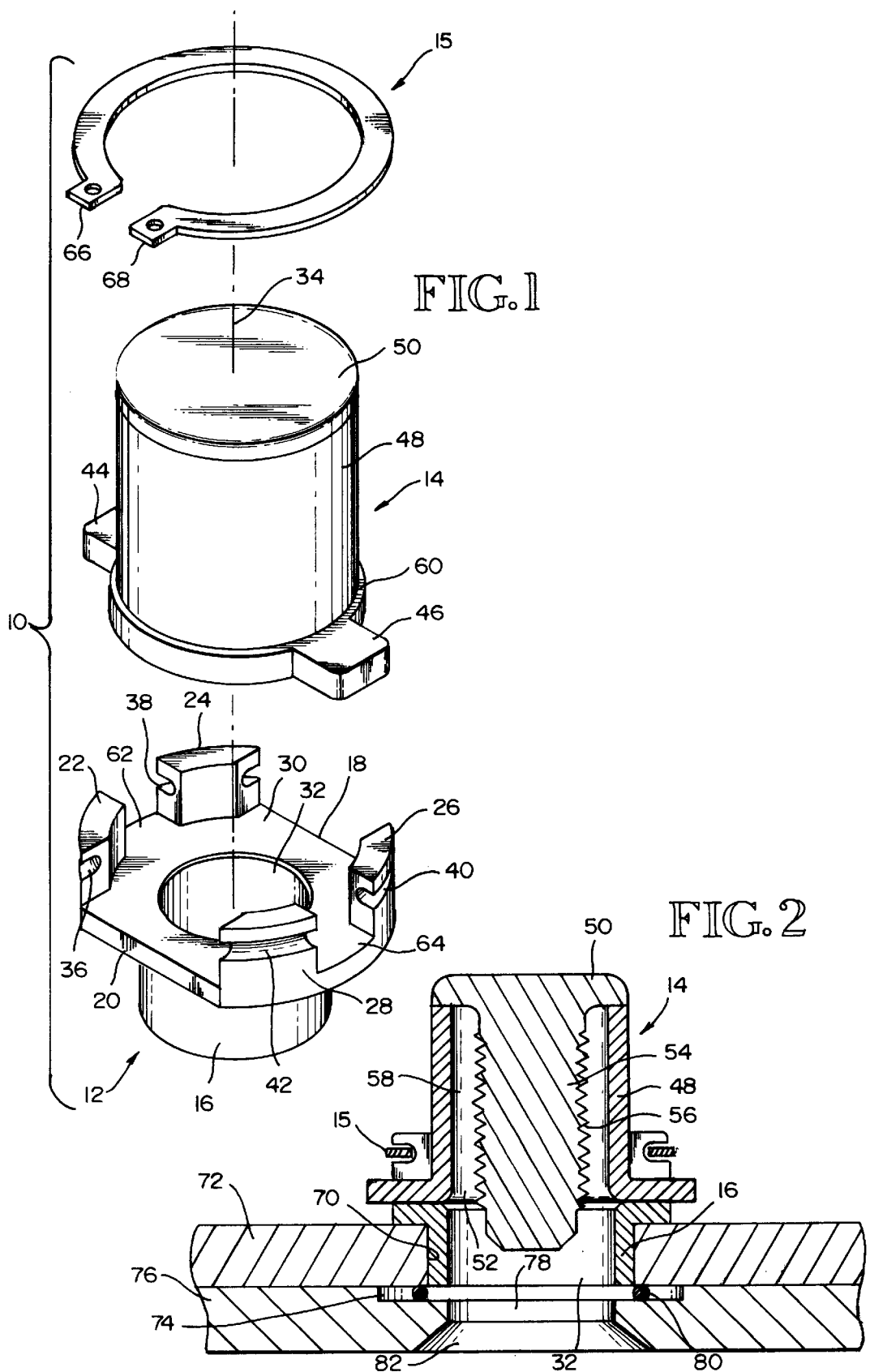

WALL BOLT ASSEMBLY

TECHNICAL FIELD

This invention relates to wall bolt assemblies composed of a bolt and structure for connecting the bolt to a wall. More particularly, the invention relates to the provision of an improved structure for holding the bolt and connecting it to the wall, by use of a single opening in the wall.

BACKGROUND OF THE INVENTION

The following patents disclose apparatus for attaching a bolt to a first wall or panel in a position in alignment with an opening in the wall or panel. A tubular nut passes through an opening in a second wall or panel, then through the opening in the first wall or panel, and then screws onto the bolt, for connecting the second wall or panel to the first wall or panel: U.S. Pat. No. 2,742,072, granted Apr. 17, 1956, to Howard J. Murphy; U.S. Pat. No. 2,991,816, granted Jul. 11, 1961, to Wallace F. Harbison and Darril D. Miller; U.S. Pat. No. 3,180,388, granted Apr. 27, 1965 to Jacob R. Newcomer Jr. and Milan Busovsky; U.S. Pat. No. 3,221,589, granted Dec. 7, 1965, to John L. Vander Sande, Warren C. Bross and Walter Trotter; and U.S. Pat. No. 3,397,727, granted Aug. 20, 1969, to Steve J. Orosz. Each of these patents disclose a tubular bolt holder having a base in the form of a mounting plate that is riveted to the first wall or panel.

U.S. Pat. No. 5,468,104, granted Nov. 21, 1995, to Leonard F. Reid and Charles M. Copple, and assigned to Fatigue Technology, Inc., shows examples of wall nut assembly comprising a nut mount that is connected to a wall by a single opening in the wall. The nut mount has a tubular stem that fits into a bolt receiving opening in a wall. The tubular stem is radially expanded in the opening to connect the nut mount to the wall. Following connection of the nut mount to the wall, a nut element is inserted into a nut cage at the outer end of the tubular sleeve and a snap ring is connected to the nut cage to secure the nut element in position within the nut cage.

There is a need for a bolt mounting structure that is adapted for easy, quick, and sure placement of a bolt on a wall at a location of an opening in the wall through which a tubular nut is to be inserted. It is believed that the bolt and bolt mounting structure of this invention will fulfill this need.

BRIEF SUMMARY OF THE INVENTION

A bolt mount of the present invention is connectable to a wall by use of a singular circular opening in the wall. The bolt mount is basically characterized by a tubular stem or bushing having an outside diameter sized for close fit insertion into the circular opening in the wall, and a center opening. A bolt receptor is provided at one end of the tubular stem, e.g. as a flange that is formed with or connected to one end of the stem or bushing. It includes a base portion that is connected to the tubular stem. The base portion is against the wall when the tubular stem is within the opening in the wall. The bolt receptor further includes a fence portion projecting from the base portion in a direction opposite the tubular stem. The fence portion surrounds an inner space and there is at least one radial restraint opening in the fence portion extending radially outwardly from the inner space.

A bolt-element retainer of the present invention is basically characterized by tubular housing including a tubular sidewall, a closed end, an open end, and at least one radial projection at the open end sized to fit in the radial restraint opening in the fence portion of the bolt receptor. A bolt-element is provided inside the bolt-element retainer. The bolt-element has a first end fixed to the closed end of the bolt-element retainer. It further has a threaded body in the tubular housing that extends from the closed end towards the open end. An annular space is formed within the tubular housing around the threaded body.

According to an aspect of the invention, the bolt-element retainer is placed in the inner space of the bolt receptor, with its open end directed towards the base of the bolt receptor and the radial projection in the radial opening in the fence portion. A retainer ring is provided to hold the bolt-element retainer in position relative to the bolt receptor. The retainer ring is adapted to engage the fence portion of the bolt receptor when the bolt-element retainer is in the inner space and its radial position is in the radial restraint opening in the fence portion. When the retainer ring is so engaged, it has a portion that extends over the radial projection, to prevent movement of the bolt-element retainer axially outwardly from said inner space and said radial possession out from the said radial restraint opening.

In preferred form, the bolt receptor has two radial openings in its fence portion, each leading radially outwardly from the inner space. Preferably also, the radial openings are in diametric opposite sides of the base. The bolt-element retainer has two radial projections at its open end, one for each of the radial restraint openings in the fence portion. The retainer ring has portions that extend over both of the radial projections, to prevent movement of the bolt-element retainer axially out from said inner space and said radial projections out from said radial restraint openings.

In preferred form, the fence portion of the bolt receptor includes a radially outwardly girth groove in which the retainer ring is received.

According to an aspect of the invention, the bolt-element retainer is slidable in position on the base, both lengthwise of the radial opening (s) in the fence portion and laterally of said radial opening (s) in the fence portion. This results in the bolt-element inside the bolt-element retainer being adjustable in position relative to the center opening in the tubular stem.

In preferred form, the fence portion comprises four fence portion segments, each projecting from the base portion. One of the radial restraint openings is formed by and laterally between a first adjacent pair of the fence portion segments. The other radial restraint opening is formed by and between the second pair of fence portion segments. Preferably also, the fence portion segments have concave inner surfaces that are substantially of cylindrical curvature, formed about an axis that coincides with a centerline axis that extends through the tubular stem. The tubular sidewall of the bolt-element retainer is slightly smaller in diameter than the cylinder of which the inner surfaces of the fence portion segments are apart.

Another aspect of the invention is to provide a fastener assembly that includes the bolt mount, the bolt-element retainer, the bolt-element inside the bolt-element retainer, and the retainer ring. The bolt mount is installed with its stem portion within the circular opening in a first wall. A second wall is positioned against the first wall with an opening in the second wall in alignment with the center opening in the tubular stem. Then, a tubular body portion of a tubular nut is introduced through the opening in the second wall and through the center opening in the tubular stem. The tubular nut has internal threads that mesh with and thread onto the threaded body of the bolt-element. The elongated nut-element also includes a head portion that contacts and bears against a region of the second wall that surrounds the opening in the second wall.

An important feature of the present invention is a relationship of the bolt-element retainer to a wall insert that includes a tubular bushing that fits into an opening in the wall and an outboard flange at one end of the bushing. The bolt-element retainer has a base that contacts the outboard flange on the bushing. A tubular nut extends through the bushing and into the bolt-element retainer. The tubular nut has internal threads that mate with external threads on the bolt-element inside the bolt-element retainer. The tubular nut may make a clearance fit, a net fit or possibly even an interference fit with the bushing. The connection that is formed is a strong connection capable of carrying large shear loads.

These and other advantages, objects, and features will become apparent from the following best mode description, the accompanying drawings, and the claims, which are all incorporated herein as part of the disclosure of the invention.

BRIEF DESCRIPTION OF THE DRAWINGS

Like reference numerals are used to designate like parts throughout the several views of the drawing, wherein:

FIG. 1 is an exploded pictorial view of a wall bolt assembly exemplifying the present invention;

FIG. 2 longitudinal sectional view through the wall bolt assembly, a wall or panel to which it is attached, and a second wall or panel;

DETAILED DESCRIPTION OF THE INVENTION

Figure 3:
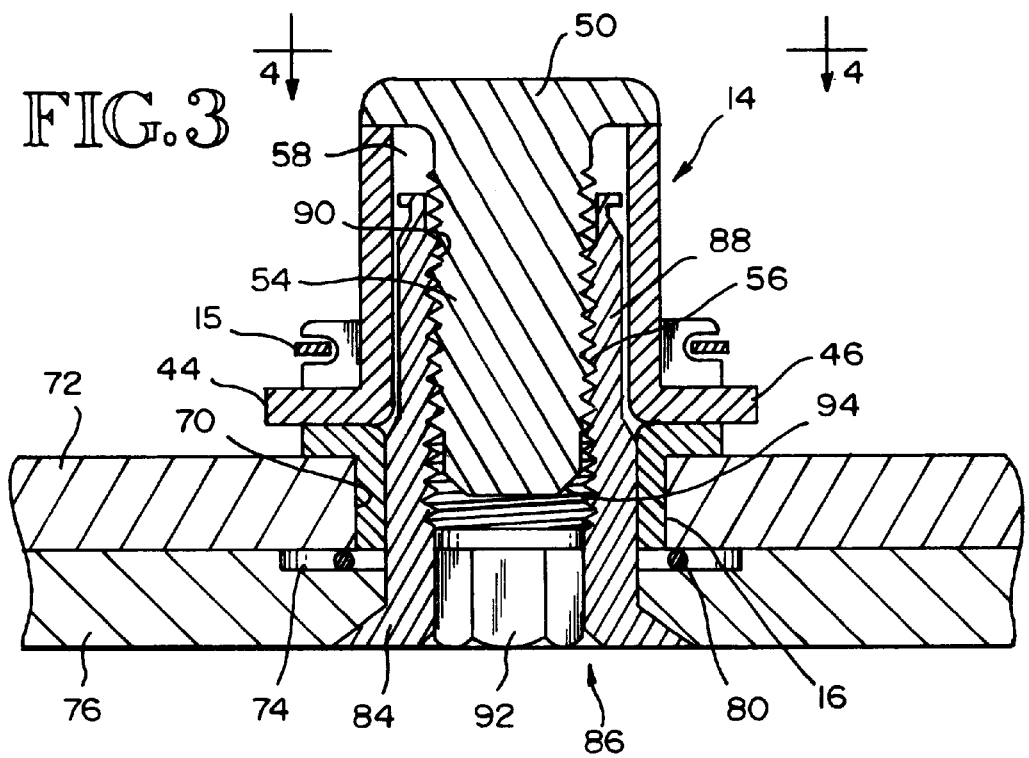
FIG. 3 is a view like FIG. 2, but showing a tubular nut installed and used for connecting the second wall or panel to the bolt-element and the first wall.
Figure 4:
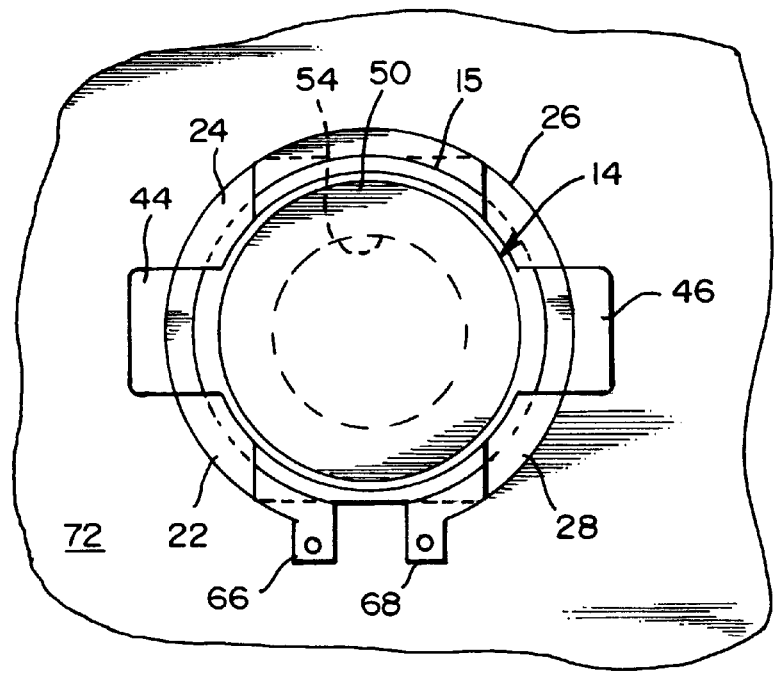
FIG. 4 is a top plan view taken substantially along line 4—4 of FIG. 3.

FIG. 1 shows a wall bolt assembly 10 comprising a bolt mount 12, a bolt-element retainer 14 and a retainer ring 15. The bolt mount 12 comprises a tubular stem 16, and a bolt-element receptor 18 having a base portion 20 at one end of the tubular stem 16. The stem 16 may function as a bushing. The bolt-element receptor 18 includes a fence portion 22, 24, 26, 28 projecting from the base portion 20 in a direction opposite the tubular stem 16. The base portion includes an open space within the confines of the fence portion 22, 24, 26, 28. The open space includes a floor 30 that forms the end surface of the base 20 opposite the stem 16. Tubular stem 16 includes a center opening 32 that rises up through the base 20.

The fence portion in the illustrated embodiment is composed of four corner parts, each having inner and outer surfaces. The inner surfaces are concave and are preferably segments of a cylinder or near to it. The outer surfaces are convex and they are preferably also segments of a cylinder. The two cylinders have an axis of generation that coincides with an axis 34 that is a centerline axis for both the opening 32 in tubular stem 16 and the outer surface of tubular stem 16. The fence portion 22, 24, 26, 28 includes girth groove segments 36, 38, 40, 42 that are spaced axially from the surface 30 by an amount equal to or slightly greater than the thickness of radial projections 44, 46 that are on the bolt-element retainer 14. The axial height of the groove segments 36, 38, 40, 42 is sufficient to accommodate the thickness of the retainer ring 15.

Bolt-element retainer 14 includes a tubular housing formed by a tubular sidewall 48, having a closed upper end 50 and an open lower end 52 (FIG. 2). Closed end 50 may be formed integral with a bolt-element 54 that extends from closed end 50 axially through the tubular housing 48. Bolt-element 54 includes external threads 56. An annular space 58 exists around bolt-element 54, between it and tubular sidewall 48. This is shown in FIG. 2. Bolt-element retainer 14 includes a base 60 from which the projections 44, 46 project, as shown by FIGS. 1–5. The fence portion segments 22, 24 form a radial restraint opening 62 between them. In like fashion, the fence portion segments 26, 28 form between them a radial restraint opening 64. The openings 62, 64 are sized to receive the projections 44, 46. When the base 60 of the bolt-element retainer 14 is setting on the surface 30, the projections 44, 46 are in the openings 62, 64, setting down on portions of the surface 30 that extend between fence portion segments 22, 24, 26, 28.

Referring to FIG. 2, when the bolt-element retainer 14 is moved to place its base 60 within the inner space defined by and between the fence portion segments 22, 24, 26, 28, the cylindrical outer surface of the tubular housing 48 is substantially concentric with the concave inner surfaces of the fence portion segments 22, 24, 26, 28. However, the concave surface portions of the fence portion segments 22, 242, 26, 28 have a larger diameter than the diameter of the outer surface of tubular housing 48. As a result, the tubular housing 48 can shift in position within the space between the fence portion segments 22, 24, 26, 28. The openings 62, 64 are wider than the projections 44, 48. Therefore, they allow such shifting movement to occur. The movement can be described as an orbiting movement. This movement can also be described as a lateral "float". The bolt-element retainer 14 is capable of floating radially in a full 360° zone.

Following placement of the base 60 of bolt-element retainer 14 within the space that is defined by and between the fence portion segments 22, 24, 26, 28, the retainer ring 15 is positioned in the girth groove segments 36, 38, 40, 42. As is known to persons skilled in the art, there is a tool that allows the free end 66, 68 to be grasped and spread apart an amount sufficient to allow placement of the retainer ring 15 into the grooves 36, 38, 40, 42. This positioning of the ring 15 in the grooves 36, 38, 40, 42 is shown by top plan view 4. When installed, the retainer ring 15 extends over the projections 44, 46, thus preventing axial movement of the bolt-element retainer 14 up off of the surface 30 and out from the space above surface 30 and between fence portions segments 22, 24, 26, 28. The openings 62, 64 and the open spaces between fence portion segments 22, 28 and fence portion segments 24, 26 are narrower than the bolt-element retainer 14. Thus, it is not possible for the bolt-retainer 14 to move sideways out from its place of confinement within the fence portion of the bolt mount 12.

Referring to FIG. 2, the tubular stem 16 of the bolt mount 12 is shown within a circular opening 70 formed in a first member 72, e.g. a first wall or panel. In FIG. 2, the tubular stem 16 is shown to extend to the inner surface of panel 72. A seal ring socket 74 is formed in a second member, e.g. a second wall or panel 76, immediately about an opening 78 in the panel 76 that is in coaxial alignment with the center opening in stem portion 16.

As shown in FIG. 2, a seal ring 80 is placed in the seal socket 74. Opening 78 includes a flared entrance 82 for receiving the countersunk head 84 of a tubular nut 86 (FIG. 3). Tubular nut 86 includes an elongated tubular body portion 88 that is internally threaded at 90. The internal threads 90 engage the external threads 56 on the nut element 54. Following assembly of the element shown in FIG. 2, the tubular nut element 86 is inserted through opening 78 and into the annular space 58 about bolt element 56. A turning tool is inserted into a turning tool socket 92. Socket 92 may have a hexagonal shape and the turning tool (not shown) may have a matching hexagonal end portion that is inserted into the socket 92. Rotation of the tool will rotate the tubular nut 86, causing its threads 90 to engage and move along the threads 56. As this happens, the tubular nut 86 moves endwise into the space 58. Eventually, the flared end 84 moves into the flared entrance 82 of the opening 78. As the inner end of the tubular nut 86 is moved into the opening 78, it contacts the beveled surface 94 on the confronting end of bolt-element 54. This contact moves the bolt-element 54 and the bolt-element retainer 14 sideways, so as to align the tubular nut portion 88 with the annular opening 56. At least during initial rotation of the tubular nut 86, additional sideways shifting of the elements 54, 14 may occur, at least until the tubular nut 86 is sufficiently within the tubular stem 16 to assure a proper alignment of the tubular nut portion 86 with the bolt element 54 and the annular space 58. The tubular nut 86 is rotated until rotation stops. At that time, the bolt-element retainer 14 will be drawn into tight contact with the surface 30 on the base 20 of bolt mount 12.

Preferably, the bolt mount is assembled to the first wall by use of the tooling and method disclosed in U.S. Pat. No. 5,380,136, granted Jan. 10, 1995 to Charles M. Copple and Leonard F. Reid, and assigned to Fatigue Technology, Inc. The tubular stem of the bolt mount 16 is inserted into a circular opening 70 in the wall 72. See FIG. 10 of U.S. Pat. No. 5,380,136. Then a split sleeve is inserted onto a mandrel that is attached to a puller tool. Next the sleeve and mandrel are inserted through the center opening 32 in the tubular stem 16, as shown by FIGS. 12 and 13 of U.S. Pat. No. 5,380,136. Then, the puller is operated to pull the mandrel through the sleeve and through the center opening 32. A nose piece holds the split sleeve in place within the tubular stem while the puller tool pulls the mandrel through the opening 32. This moves the enlarged end of the mandrel through the split sleeve. The forceful movement of the enlarged end of the mandrel through the split sleeve causes a radial expansion of the split sleeve and a radial expansion of the tubular stem 16. The expansion that occurs is sufficient to cause a permanent increase in the outside and inside diameters of the tubular stem 16. This radial expansion of the tubular stem 16 introduces fatigue life-enhancing compressive residual stresses in the wall 72 immediately around the tubular stem 16. These stresses shield the opening 70 from the action of cyclic tensile stresses that propagate fatigue cracks.

The radial expansion also creates a tight interference fit between the tubular stem 16 and the sidewall of the opening 70. This tight interference fit secures the bolt mount 12 to the wall 72 and provides resistance to torque and removal forces encountered during fastener installation and removal. The outer surface of the tubular stem 16 may be machined or otherwise treated in order to give it an increased coefficient of friction. For example, the bolt mount 12 may be turned on a lathe, and a series of small grooves may be machined in the outer surface of the tubular stem 16. The outside surface of the tubular stem 16 may also be roughened using a sand-blasting technique.

A more complete description of fatigue enhancement by cold expansion may be found in U.S. Pat. No. 3,566,662, granted Mar. 2, 1971, to Lewis A. Champoux. A mandrel only or a split mandrel coldworking processing can also be used for installing the bolt mounts 12 and introducing fatigue life-enhancing compressive residual stresses in the wall 72 immediately surrounding the hole or opening 70.

In accordance with an aspect of the invention, the tubular stem 16 is in effect a bushing for the tubular nut 86. The base portion of the bolt-element receptor is a flange on the bushing. In the preferred embodiment, this flange and the elements 22, 24, 26, 28 are formed integrally with the stem 16. However, it is also possible to make the base or flange separate from the stem or bushing 16, and then connect them together. Also, the manner of securing the bolt-element retainer to the bolt receptor can be different from what is illustrated. The retainer ring 15 can take different forms than what is illustrated. For example, it can be made of wire. Also, it could made to clip on to the elements 22, 24, 26, 28, or their equivalents, by a simple pushing action.

Figure 5:
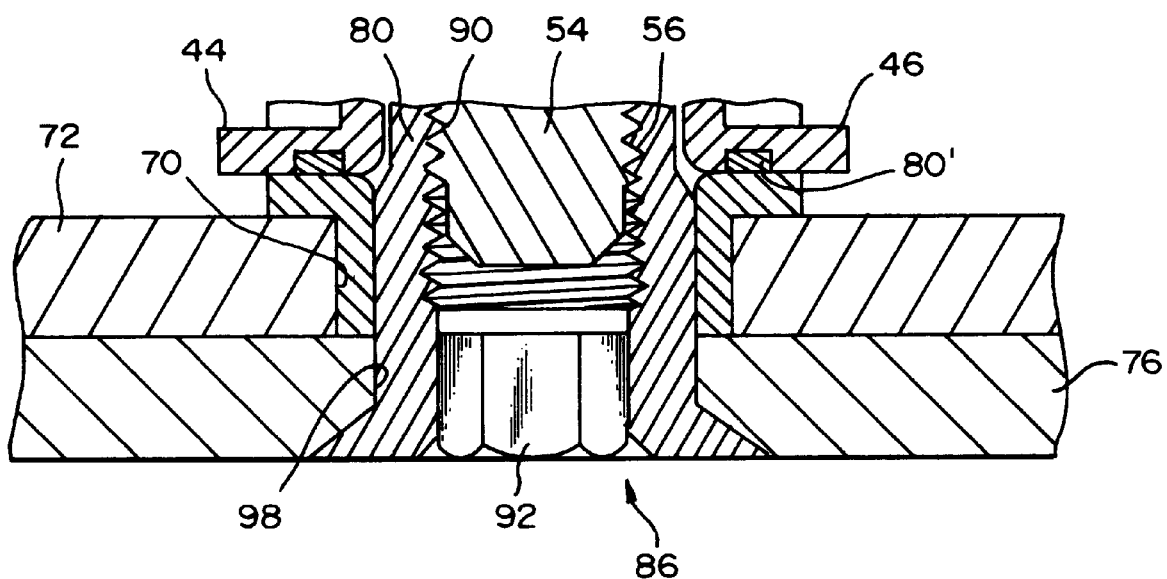
FIG. 5 is an enlarged scale fragmentary view of the lower portion of FIG. 3, showing elimination of the seal groove and seal from the second panel, and the addition of a seal groove and seal in the base of the bolt-element retainer.

The seal groove 74 is optional. Also, as shown by FIG. 5, a seal groove may be formed in the base of the bolt-element retainer 14 and a seal ring 80' placed in this groove. Then, when the parts are assembled, and the tubular nut 86 is tightened, the base of the bolt-element retainer is pulled tight against the outboard flange on the bushing, e.g. the base structure on the tubular stem 16.

The tubular nut 86 is sized to make either a "net fit" or a "clearance fit" with the center opening in the bushing or stem 16. It might be possible to also use an interference fit.

The combinations shown by FIGS. 3 and 5 produce a strong connection. In preferred form, the bushing or stem 16 is cold expanded to connect it to the wall or panel 72 and in the process fatigue life-enhancing compressive residual stresses are introduced into the wall 72 immediately surrounding the opening 70. The tubular nut 86 is guided by the center opening in the bushing or stem 66 in proper alignment with the threads on the bolt-element 54. As a result, there is proper thread engagement where the threads 56, 90 meet and a cross-thread condition is prevented. The tubular nut by itself has high shear strength. This is enhanced by the presence of the stem or bushing 16 in the opening 70.

Referring to FIG. 2, the elements 14, 50 are not installed when the cold expansion tooling is used (if used) to install the bushing or stem 16 within the opening 70. Following this installation, the bolt-element retainer 14 is placed with its base 6 on the outboard flange. Regardless of how the bolt-element retainer 14 is secured to the outboard flange on the stem or bushing 16. A benefit would be obtained from the invention even if the bolt-element retainer 14 was not secured to the outboard flange. Comparing FIGS. 2 and 3 for example, with the bolt-element retainer 14 positioned with its base against the flange surface 30, the connector is ready to receive the tubular nut 86. The shank 88 of the tubular nut 86 is inserted through the opening 98 in the second wall 76, from the second side of the second wall 76. The tubular nut 86 is then moved inwardly until a start of its threads 90 meet the start of the threads 56. Then, the tubular nut 86 is rotated so as to make its threads 90 and travel along the threads 56. Rotation is continued until there is a tight engagement between the bolt-element 54 and the tubular nut element 86. At that time the bolt-element retainer 14 is at its base in tight engagement with the flange surface 30. The second side (inside) of the wall 72 is against the first side (inside) of the wall 76. The wall 72, 76 are drawn tight together and the bolt-element 54 and the tubular nut 86 are drawn tight together. A connection is provided which has high shear strength.

It is within the scope of the invention to secure the tubular stem 16 within an opening by means other than by coldexpansion. For example, the hole can be threaded and matching threads can be placed on the tubular shank, enabling the tubular shank to be screwed into the threaded opening. Or, the tubular shank could be made longer than the opening into which it is inserted so that it has an end portion that projects out the back side. Once the bolt mount 16 is installed in the opening, the projecting end portion can be flared to in that manner connect the tubular stem to the wall or other workpiece. Also, the bolt mount of this invention can be used in a wide variety of workpiece members and materials. It can be used in metal members, composites, and various structural plastics. In the case of installation in composite materials (i.e. non-metallic) cold expansion is controlled to prevent localized damage to the surrounding composite material.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A wall bolt assembly, comprising:
   a bolt mount that is connectable to a wall by use of a single circular opening in the wall, said bolt mount comprising a tubular stem having an outside diameter sized for close fit insertion into said circular opening in the wall, and a center opening with an inside diameter; and a bolt receptor having a base portion at one end of the tubular stem, that is against the wall when the tubular stem is within the opening in the wall, and a fence portion projecting from the base portion in a direction opposite the tubular stem, an inner space within said fence portion and at least one radial opening in said fence portion extending radially outwardly from the inner space;
   a bolt-element retainer having a tubular housing including a tubular sidewall, a closed end, an open end, and at least one radial projection at the open end sized to fit in the radial opening in the fence portion; and a bolt-element inside the bolt-element retainer, said bolt-element having a first end fixed to the closed end of the bolt-element retainer, and a threaded body in the tubular housing extending from the closed end towards the open end, with an annular space being formed within the tubular housing around the threaded body; and
   a retainer ring adapted to engage the fence portion when the bolt-element retainer is in the inner space and its radial projection is in the radial opening in the fence portion, with a portion of the retainer ring extending over the radial projection, to prevent movement of the bolt-element retainer axially out from said inner space and said radial projection out from said radial opening.

2. A wall bolt assembly according to claim 1, comprising at least two radial openings in the fence portion, leading radially outward from the inner space, said radial openings being on diametric opposite sides of the base, wherein the bolt-element retainer has two radial projections at its open end, one for each of the radial openings in the fence portion, and wherein the retainer ring has portions that extend over both of the radial projections, to prevent movement of the bolt-element retainer axially out from said inner space and said radial projections out from said radial openings.

3. A wall bolt assembly according to claim 1, wherein the fence portion of the bolt receptor includes a radially outwardly opening girth groove in which the retainer ring is received.

4. A wall bolt assembly according to claim 2, wherein the fence portion of the bolt receptor includes a radially outwardly opening girth groove in which the retainer ring is received.

5. A wall bolt assembly according to claim 1, wherein the bolt-element retainer is slidable in position on said base, both lengthwise of the radial opening in the fence portion and laterally of said radial opening in the fence portion, for adjustably mounting the bolt-element inside the bolt-element retainer relative to the inside of the tubular stem.

6. A wall bolt assembly according to claim 2, wherein the bolt-element retainer is slidable in position on said base, both lengthwise of and laterally of said radial openings in the fence portion, for adjustably mounting the bolt-element inside the bolt-element retainer relative to the center opening the tubular stem.

7. A wall bolt assembly according to claim 1, wherein said fence portion comprises four fence portion segments, each projecting from the base portion, with one of said radial openings being formed by and laterally between an adjacent first pair of the fence portion segments, and the other radial opening being formed by and between an adjacent second pair of fence portion segments.

8. A wall bolt assembly according to claim 7, wherein the fence portion segments have concave inner surfaces that are substantially of cylindrical curvature, formed about an axis that coincides with a centerline axis that extends through the tubular stem, and wherein said tubular sidewall of the bolt-element retainer is slightly smaller in diameter than the cylinder of which the inner surfaces of the fence portion segments are apart.

9. An assembly, comprising:
   a first wall including a circular opening;
   a bolt mount having a tubular bushing that is within said circular opening, said tubular bushing being radially expanded to secure it to the first wall and prevent it from rotating relative to the wall; and a bolt receptor having a base portion at one end of the tubular bushing that is against the first wall, and a fence portion projecting from the base portion in a direction opposite the tubular bushing and away from the first wall, said fence portion having fence portion segments positioned about an inner space, and defining at least a pair of radial restraint openings in the fence portion extending radially outwardly from the inner space;
   a bolt-element retainer including a tubular sidewall, a closed end, and open end and a plurality of radial projections at the open end, one for each radial restraint opening in the fence portion, said radial projections being sized to loosely fit in the radial restraint openings in the fence portion;
   a bolt-element inside the bolt-element retainer, said bolt-element having a first end that is fixed to the closed end of the bolt-element retainer, and a threaded body in the tubular housing extending from the closed end towards the open end, with an annular space being formed within the tubular housing around the threaded body;
   said bolt-element retainer being positioned within the space inside the fence portion segments of the bolt mount, with its open end directed downwardly in axial alignment with the center opening of the tubular stem, and with the radial projections within the radial openings in the fence portion;

a retainer ring engaging the fence portion segments and extending over the radial projections, and blocking axial movement of the bolt-element retainer out from the inner space of the fence portion and the radial projections out from the radial openings;

a second wall having a second opening, said second wall being against the first wall with its opening in alignment with the center opening of the tubular stem; and a tubular nut having a tubular body portion that extends through the opening in the second wall and through the center opening in the tubular stem, said tubular nut having internal threads that mesh with and thread onto the threaded body of the bolt-element, said elongated nut-element also including a head portion that contacts and bears against a region of the second wall that surrounds the opening in the second wall.

10. For use with a first wall having a first side, a second opposite side and a circular first opening, and a second wall having a first side that in use is directed towards the second side of the first wall, and a second opening that is alignable with the first opening in the first wall, a connector assembly, comprising:

a tubular bushing sized to fit within the first opening in the first wall, said bushing having a center opening;

an outboard flange at a first end of the bushing, said flange having a first side that in use is directed towards the first side of the first wall when the bushing is within the first opening in the first wall, and further having a second, opposite side;

a bolt-element retainer having a tubular sidewall, a closed end, an open end and a base at the open end that in use contacts the second side of the outboard flange;

a bolt-element inside the bolt-element retainer, said bolt-element having a first end fixed to the closed end of the bolt-element retainer, and an externally threaded body extending from the closed end towards the open end, with an annular space being formed around the threaded body between it and the tubular sidewall; and a tubular nut having a tubular shank that in use extends through the second opening in the second wall into the annular space in the bolt-element retainer, said tubular shank including a center opening with internal threads that mate with the external threads on the bolt-element, and said tubular nut including a head that in use bears against the second wall when the tubular nut is threaded into tight engagement with the threaded body of the bolt-element, to draw the bolt-element retainer towards the flange on the tubular bushing, the flange on the bushing towards the first wall, the head on the tubular nut towards the second wall, and the second wall towards the first wall.

11. A connector assembly according to claim 10, wherein the tubular nut is sized to make a clearance fit with the center opening of the bushing.

12. A connector assembly according to claim 10, wherein the tubular nut is sized to make a net fit with the opening in the bushing.

13. A connector assembly according to claim 10, wherein the outboard flange includes axial projections that project from the flange in a direction opposite from the bushing, said axial projections defining a center space on the second side of the flange and radial openings extending radially outwardly from the center space, wherein said bolt-element retainer includes a plurality of radial projections at its base, wherein in use the radial projections at the base of the bolt-element retainer fit within radial openings defined by the axial projections on the flange and the bolt-element retainer is movable in position on the flange within confines established by the axial projections on the flange, wherein the axial projections on the flange include retaining ring slots, and wherein the connector assembly includes a retainer ring that engages the slots and extends over the radial projections, thereby blocking axial movement of the bolt-element retainer out from the confines established by the axial projections on the flange.

14. In combination:

a first member including a first side, a second, opposite side and a circular first opening;

a tubular bushing within the circular first opening, said bushing having an outer surface making a tight fit within the first circular opening, and a center opening;

an outboard flange at a first end of the bushing, said flange having a first side directed towards the first side of the first member and a second, opposite side;

a bolt-element retainer having a tubular sidewall, a closed end, an open end and a base at the open end contacting the second side of the outboard flange;

a bolt-element inside the bolt-element retainer, said bolt-element having a first end fixed to the closed end of the bolt-element retainer, and an externally threaded body extending from the closed end towards the open end, with an annular space being formed around the threaded body between it and the tubular sidewall;

a second member having a first side directed towards the second side of the first member, said second member including a second opening that is in axial alignment with the center opening in the bushing; and a tubular nut having a tubular shank that in use extends through the opening in the second member into the annular space within the bolt-element retainer, said tubular shank including a center opening with internal threads that mate with the external threads on the bolt-element, said tubular nut including a head that in use bears against the second member when the tubular nut is threaded into tight engagement with the threaded body of the bolt-element.

15. The combination of claim 14, wherein the tubular nut is sized to make a clearance fit with the center opening of the bushing.

16. The combination of claim 14, wherein the tubular nut is sized to make a net fit with the opening in the bushing.

17. The combination of claim 14, wherein the tubular bushing is cold expanded into the circular opening in the first member.

18. The combination of claim 17, wherein the tubular bushing is cold expanded to such an extent that it introduces fatigue life-enhancing compressive residual stresses in the first member immediately surrounding the opening in said first member.

* * * * *

UNITED STATES PATENT AND TRADEMARK OFFICE
CERTIFICATE OF CORRECTION

PATENT NO: 6,077,010

DATED: June 20, 2000

INVENTOR(S): L. F. Reid, C. M. Copple, T. H. Johnson

It is certified that error appears in the above-identified patent and that said Letters Patent are hereby corrected as shown below:

On the cover, under "[75] Inventors:", "Timonth H. Johnson" should be
-- Timothy H. Johnson --.

Column 2, line 20, "radial possession" should be -- radial projection --.

Column 3, line 28, following "Fig. 2", insert -- is a --.

Column 4, line 29, "22, 242, 26" should be -- 22, 24, 26 --.

Column 6, line 17, following "it could", insert -- be --.

Column 6, line 48, "bushing 16. A benefit" should be -- bushing 16, a benefit --.

Column 6, line 58, after "threads 90", delete "and".

Column 6, line 64, "wall" should be -- walls --.

Column 7, lines 2 and 3, "coldexpansion" should be -- cold-expansion --.

Signed and Sealed this

Seventeenth Day of April, 2001

*Attest:*

NICHOLAS P. GODICI

*Attesting Officer*     Acting Director of the United States Patent and Trademark Office